United States Patent [19]

Swart et al.

[11] Patent Number: 4,720,275

[45] Date of Patent: Jan. 19, 1988

[54] QUICK TERMINATION APPARATUS AND METHOD FOR ELECTRICAL CONNECTOR

[75] Inventors: Mark A. Swart, Upland; Charles J. Johnston, West Covina, both of Calif.

[73] Assignee: Everett/Charles Contact Products, Inc., Pomona, Calif.

[21] Appl. No.: 851,334

[22] Filed: Apr. 14, 1986

[51] Int. Cl.4 .................................. H01R 13/62
[52] U.S. Cl. .................................. 439/725; 439/863; 29/857
[58] Field of Search ............... 339/200 R, 201, 221 R, 339/216 R, 101, 151 B, 61 R, 209, 210 R, 244 R, 218 S, 273 R, 273 F, 276 R, 276 S, 276 T; 29/857, 859

[56] References Cited

U.S. PATENT DOCUMENTS

| | | | |
|---|---|---|---|
| 985,791 | 3/1911 | Dubail | 339/218 S |
| 2,252,553 | 8/1941 | Cambell | 339/101 |
| 2,570,800 | 10/1951 | Hamm | 339/101 |
| 3,510,827 | 5/1970 | Spangler | 339/276 T |
| 3,744,006 | 7/1973 | O'Loughlin | 339/273 F |
| 4,270,824 | 6/1981 | Erickson | 339/273 R |
| 4,390,223 | 6/1983 | Zenkich | 339/61 R |

OTHER PUBLICATIONS

SPA-O "Snap-Out" Spring Probe; Everett/Charles, Inc.; Nov. 1, 1974 (Publication).
New 160 Series Probes/Receptacles; QA Technology Company, Inc.; 1985 (Publication).
Advertisement appearing in Interconnect Devices, Inc., Apr., 1986.

Primary Examiner—Gil Weidenfeld
Assistant Examiner—Thomas M. Kline
Attorney, Agent, or Firm—Christie, Parker & Hale

[57] ABSTRACT

A quick termination assembly for an electrical connector to a flexible wire. The connector comprises an electrical conductive tube. The tube has separate end opening and side opening to the passage and a ramp facing out of and extending towards the side opening from the passage. The end opening and passage are adapted to receive a bare end of the wire upon insertion therein, the ramp, during such insertion, forcing the bare wire to bend and move along the ramp out of the side opening to a position extended away from the tube. A non-conductive sleeve extends around the wire. The sleeve, as it is forced to slide along the wire and tube, engages the extended bare wire, causing the bare wire to bend against an exterior side of the tube and pass over and encircle the bare wire and tube, thereby gripping and retaining the bare wire and tube in electrical and mechanical contact with each other.

27 Claims, 10 Drawing Figures

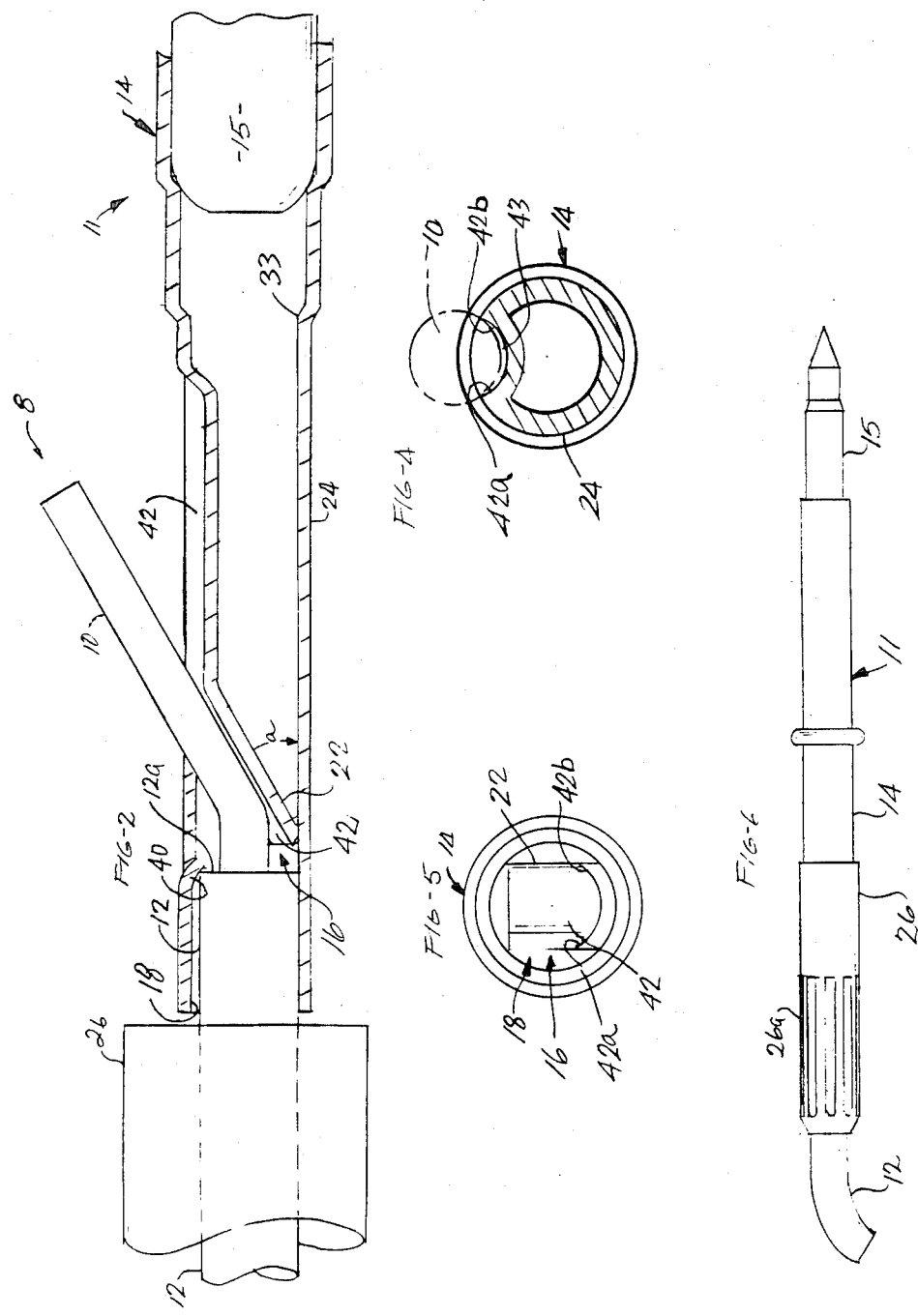

QUICK TERMINATION APPARATUS AND METHOD FOR ELECTRICAL CONNECTOR

FIELD OF THE INVENTION

This invention relates to termination, apparatus and methods for making up an insulated wire to an electrical connector and, more particularly, to quick, termination apparatus and methods for electrical connections.

BACKGROUND OF THE INVENTION

Spring probes are commonly used for probing bare and loaded printed wiring boards for test purposes. Typically, the spring probes are inserted into a tubular receptacle or connector for ease of insertion and removal. The receptacle, in turn, is inserted into a probe plate of a test fixture. The test fixture is typically actuated by vacuum for drawing the probe plate (with the receptacles and spring probes) and printed wiring board together until the spring probes and printed wiring board are in electrical contact.

An example, of such a test fixture with spring probes mounted in tubular receptacles in a probe plate, is disclosed in U.S. Pat. No. 4,322,682.

With the advent of more concentrated circuitry and more closely spaced test points, a need has arisen for placing the probes closer together and, therefore miniaturizing the spring probes and receptacles. At the current time a need exists for low cost, easy to assemble miniature spring probes and receptacle assemblies of about 0.036 inches (0.914 millimeters) or smaller in overall diameter, which can be mounted for probing test points spaced 0.050 inches (1.27 millimeters) on center or closer.

The receptacles are each terminated to an insulated flexible wire. Several different techniques exist for termination. For example, insulated wires are crimped or soldered to receptacles.

However, it is generally desirable to use replaceable or reusable terminations. One such prior art device has a stripped insulated wire passed through the center of and bent around the side of a nylon plug which, in turn, is inserted in the end of a tubular receptacle wedging the wire between plug and receptacle.

A further prior art device has a stripped insulated wire inserted in the end of and soldered to a tubular shaped wire plug. The plug is inserted into the end of the tubular receptacle for a spring probe. An insulated sleeve is mounted around the end of the plug and onto the insulated wire so as to prevent electrical contact between the adjacent ends of crossed closely spaced receptacles and for strain relief for the wire.

Another prior art device employs a gold plated brass machined wire plug with pinchers. The wire plug with pinchers is machined into a tube with stepped outer diameters and a pair of pinchers is machined extending from one end of the tube. A short insulator sleeve is mounted around the plug adjacent the end opposite to the pinchers. Insulated wire is stripped to provide a bare end, which is passed through the center of the tube and between the pinchers. The wire plug with the wire is inserted into the end of a tubular spring probe receptacle, which has a restriction or squeeze point which, in turn, squeezes the pair of pinchers together against the wire, gripping and holding the wire in electrical and mechanical engagement with the plug.

The prior art approaches using plugs pose difficulties. It is difficult, for example, to make the miniature plug and mating receptacle because of the small size of the receptacle which must be in the order of 0.036 inches outer diameter or smaller. Additionally, there are undesirable expenses and time consumed in machining the wire plug with pinchers. Also, the insulator sleeve on the wire plug with pinchers is very short and may not adequately insulate adjacent receptacles, should they become bent and crossed which is not unusual because of the small fragile nature of the small diameter miniature receptacle.

Further with receptacles closely spaced (i.e., 0.05 inch on center) there is virtually no room on the sides of the receptacles or, because of adjacent wiring, even close to the ends of the receptacles for one to put a tool or fingers to assist in making up a wire to the receptacle. This makes it quite difficult to insert the short plug used in the wire plug with pinchers device.

SUMMARY OF THE INVENTION

Briefly, an embodiment of the invention is a quick termination assembly for an electrical connector to a flexible wire. The connector comprises an electrical conductive tube. The tube has separate end opening and side opening to the passage and a ramp facing out of and extending towards the side opening from the passage. The end opening and passage are adapted to receive a bare end of the wire upon insertion therein. The ramp, during such insertion, forces the bare wire to bend and move along the ramp out of the side opening to a position extended away from the tube. A non-conductive sleeve extends around the wire. The sleeve, as it is forced to slide along the wire and tube, engage the extended bare wire, bending the bare wire against an exterior side of the tube and passes over and encircles the bare wire and tube, thereby gripping and retaining the bare wire and tube in electrical and mechanical contact with each other.

Another embodiment of the invention is an electrical connector and flexible wire assembly with quick termination feature. The assembly includes a flexible electrically conductive wire, the electrical connector has an electrically conductive tube. The tube has an internal passage, end opening and transverse side opening to the passage and a ramp facing out of and extending toward the side opening from in the passage. A bare end of the wire extends into the passage through the end opening with the bare wire extending in a substantially S shape from the passage, along the ramp, out of the side opening and along an external side of the tube. A non-conductive sleeve extends around and grips the combination of the bare wire and the tube to, thereby, retain the bare wire and tube in electrical and mechanical contact with each other.

A method embodying to the present invention is for quick termination of an electrical contact, comprising an electrical conductive tube. A bare flexible wire is inserted into an end opening to a passage in the tube. During the insertion the bare wire is ramped transversely out of the passage through a side opening of the tube to an outwardly extended position relative to the tube. A non-conductive sleeve mounted on the wire is slid along the wire over the tube and against the outwardly extended wire, thereby, forcing the wire to bend against an exterior side of the tube until the sleeve passes around and grips and retains both the wire and tube in electrical and mechanical contact with each other.

Preferably, in all of the above embodiments there is an insulator around a portion of the wire, and the sleeve (while mounted around and gripping and retaining the wire and tube) extends back over the tube and around the insulator on the wire.

Briefly, an embodiment of the present invention may have a number of advantages over the prior art. For example, one may achieve a quick crimpless and solderless termination on a miniature spring probe and receptacle assembly in a single step, while reducing assembly time and expense. A significant reduction in manufacturing cost of a miniature spring probe receptacle with replaceable termination may be achieved. One may achieve a substantial reduction in insertion force when terminating the insulated wire to the receptacle, thus minimizing the possibility of bending or other damage to the receptacle. Yet, with the lower insertion force, there is a retention force against separation of the terminated wire and receptacle of up to two to three times that of the aforementioned wire plug with pincher configuration. No solder, bonding or crimping is required for termination. Additionally, the non-conductive sleeve not only provides the gripping action required to maintain mechanical and electrical connection between the tube and wire but also provides insulation against shorts due to crossed receptacles and provides strain relief for the insulated wire extending out of the end of the assembly.

With an embodiment of the present invention one may insert a closely spaced array of receptacles (i.e., 0.05 inch on center) in a probe plate and later insert the insulated wire into and slide the sleeve over the receptacle to bend and grip the wire against the receptacle with ease. For example, the elongated sleeve makes the insulated wire more rigid allowing the user to grasp the end of the sleeve a sufficient distance back from the end of the wire, during insertion of the wire and subsequent sliding of the sleeve, so that the fingers do not damage adjacent previously terminated receptacles.

Further, an embodiment of the invention may be employed as a spring probe receptacle in a probe plate of a vacuum fixture. In this case the sleeve may be used to seal between the receptacle and the insulated wire, thereby, preventing leakage of vacuum across the probe plate through the receptacle.

BRIEF DESCRIPTION OF THE DRAWINGS

FIG. 2 is a side cross-sectional view of the electrical connector and flexible wire assembly taken along the lines 2—2 of FIG. 1 after the wire has been inserted and bent to a position extending away from the tube. The left end of the sleeve has been broken away and the insulator and wire are shown in full side elevation. The right hand end of the connector is broken away and by way of example a portion of a spring probe is shown in the right hand end of the connector.

FIG. 4 is a cross-sectional view of the tube and wire taken along the lines 4—4 of FIG. 3 and showing the wire in broken line.

FIG. 5 is an end view of the tube taken as viewed from the end opening 18 of FIG. 1 prior to assembly with the wire.

FIG. 6 is a side elevation view of a preferred embodiment of the invention in which the electrical connector is a receptacle for a spring probe for use in a probe plate of a vacuum fixture.

DETAILED DESCRIPTION

Figure 1:
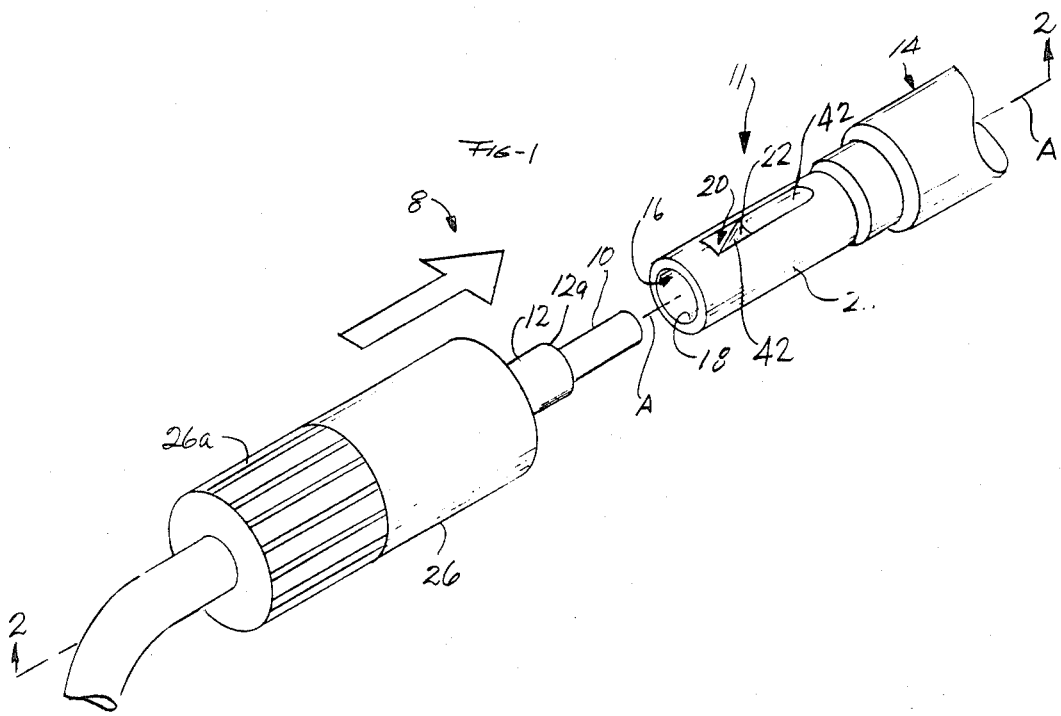
FIG. 1 is a perspective, schematic and exploded view of an electrical connector and flexible wire assembly with quick termination feature, and embodying the present invention.

Consider now the electrical connector and insulated flexible wire assembly with quick termination feature disclosed at 8 in FIGS. 1 to 6.

Flexible wire 10 is mounted in and extends exposed from an end of a tubular wire insulator 12. The wire and insulator form a conventional insulated wire assembly, well known in the art. The wire is electrically conductive metal and stranded or single conductor. Electrical connector 11 includes a tube 14 which is elongated along an axis indicated by broken line A. The tube has an elongated internal passage 16 which generally extends parallel with and along the axis A. The tube also includes a separate end opening 18 and a transverse side opening 20, opening at substantially 90° to each other into the passage 16. Integral with the tube 14 is a ramp 22 facing out of and extending toward the side opening 20 from the passage 16. The end of wire 10 is stripped bare a sufficient length back from its end to the end 12a of the insulator so as to extend into the passage through the end opening and, after insertion, to extend in a substantially S shape from the passage 16 along the ramp 22 and out of the side opening 20 and then along an external side 24 of the tube.

The S shape of the wire conforms to the shape of the passage, ramp and exterior of the tube, the ramp being at oblique angles to both the passage and exterior of the tube.

Figure 3:
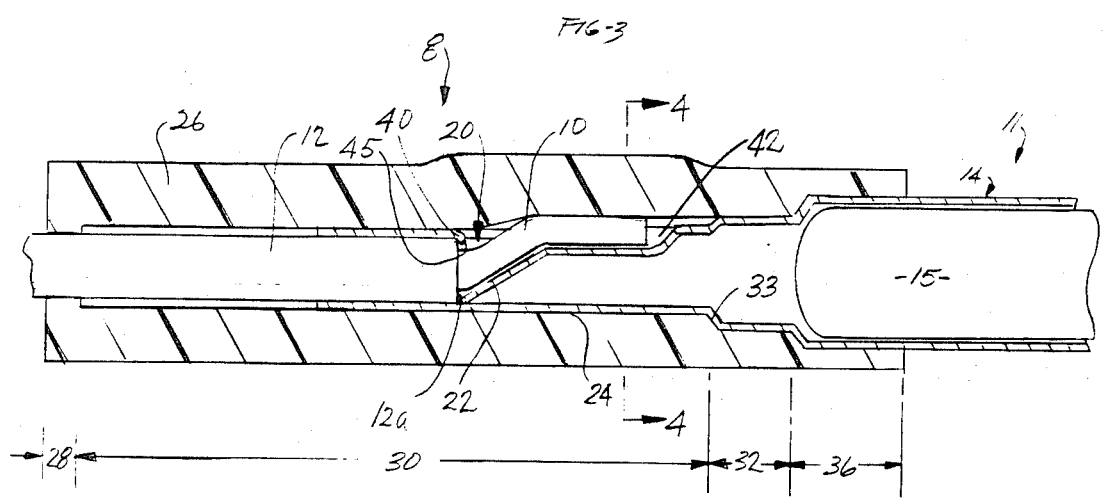
FIG. 3 is a side cross-sectional view similar to that of FIG. 2 after the sleeve has been completely slid over the wire and tube to a gripping and sealing position on the tube and wire insulator. The sleeve is shown in cross-section.

An elongated non-conductive sleeve 26, as best seen in FIG. 3, extends around, grips and seals to the external surface of the wire insulator 12 at 28, encircles and extends around and grips the bare wire and the external side of tube at 30 to, thereby, retain and maintain the bare wire and tube in mechanical and good electrical contact with each other and extends around, grips and seals to the exterior wall of the tube at 36.

The gripping action at 30 is important to the present invention in that it maintains the integrity of the electrical and mechanical connection in the order of 10 milliohms between the bare wire and the exterior of the tube so as to provide a reliable, low-resistance electrical connection between the wire and the tube. Very low level electrical signals, in the order of millivolts, are passed along the tube to the wire and visa-versa without significant drop in potential. This is important when very low level signals are being passed, as is required of miniature, closely spaced spring probes and receptacles of the type discussed hereinabove.

Significantly the wire and tube are retained fixed in mechanical and electrical contact by the sleeve without the need for soldering, cementing or other bonding.

Consider now the preferred method for quick termination of the electrical contact. The bare end of the flexible wire is inserted into the end opening 16 to the passage 18 of the tube 14. During the insertion the bare wire is ramped by the ramp 22 transversely out of the passage through the side opening of the tube to the outwardly extending position shown in FIG. 2. The non-conductive sleeve, mounted on the wire, is then slid axially along the wire over the tube and against the outwardly extending wire forcing the wire to bend against the exterior side of the tube until the sleeve passes around, grips and retains the wire and tube in electrical and mechanical contact with each other as seen in FIG. 3.

The sliding of the sleeve over the tube is stopped with the sleeve positioned extending back over the tube and around the insulator. This is important when an insulator is used on the wire, for not only sealing but for gripping onto the outside of the insulator to provide strain relief to the wire and insulator. With the gripping action of the sleeve and the S shape configuration of the wire in contact with the tube wire retention forces of 2 to 3 pounds or more are achieved.

The insertion and sliding of the sleeve can be done in one of two manners. The first and preferred method is to grasp the sleeve in one hand, and move it and hence the wire toward the tube, inserting the wire into the tube until the wire is bent to the position shown in FIG. 2 and movement of the wire is arrested, continuing the movement with the sleeve, sliding the sleeve toward the tube, bending the wire until the sleeve is properly positioned around the tube and wire as shown in FIG. 3.

The second method is to first grasp the wire, inserting it into the tube until the bare wire is bent to the proper position, and subsequently grasp the sleeve and slide it over the tube, bending the wire and properly positioning the sleeve around the wire and tube.

Consider the assembly in more detail. The assembly is initially positioned, as generally depicted in FIG. 1. Prior to insertion, as generally indicated in FIGS. 1 and 2, sleeve 26 is generally tubular shaped and circular in cross-section along its length and is positioned around the insulator 12 leaving an extension of the insulator 12 out towards the tube. A bare end of the wire 10 extends beyond the end 12a of the insulator. During assembly the wire and insulator are inserted into the end opening 18 into the passage 16. The outer periphery of the passage 16 between the end opening 16 and the ramp has a circular outer periphery which is substantially the same diameter as but slightly larger than the outer circular periphery of the insulator 12, thereby allowing the insulator to be easily slid axially along the wall of passage 16 to the right as depicted in FIGS. 1 and 2. During insertion of wire 10 and insulator 12 into the tube 14 the bare end of wire 10 engages the ramp 22 and, the continued force of the insertion, causes the ramp to force the bare wire to bend and move along the ramp and outward through the side opening 20 to a position which is extended away from the tube as generally depicted in FIG. 2. The ramp is inclined at such an angle relative to the inside wall of passage 16 as to provide for ease of insertion during bending of the wire 10.

The inward movement of the insulator and wire are arrested by a stop 40. Stop 40, integrally formed from a wall of the tube, has a semi-circular downward extension 40 at the left hand end of the side opening which extends inwardly partially into the passage 16. As the wire and insulator are inserted the end 12a of the insulator engages the stop 40 and prevents or arrests further inward movement. The stop engages and stops the movement of the end of the insulator during the insertion with the proper length of wire extending out of the opening to form the required mechanical and electrical contact with the outside wall of the tube.

Preferably, a semi-circular groove 42 extends along the external side 24 of the tube, starting at the end of wire 10, and down along the length of inclined ramp 22. The groove 42 preferably has a radius of curvature that is slightly smaller than the radius of the wire holding the wire between opposing sides 42a and 42b (FIG. 4). This leaves a space 43 between the wire and the bottom of the groove. The groove 42 is elongated and aligned with the opening 20 and extends generally parallel with the axis A of the tube. The groove in the ramp retains and guides the wire parallel with the axis and out of the side opening of the tube during insertion. The groove along the external wall of the tube receives and retains the bare wire aligned with the axis of the tube as the sleeve slides and bends the wire down against the side of the tube.

The outer diameter or periphery of the tube and the outer diameter of the inner passage of the sleeve increase in steps moving from left to right through positions 28, 30, 32 and 36 in FIG. 3. The diameter of the central passage of the sleeve at 28 is at its smallest diameter and, before mounting thereon, is slightly smaller than the outer diameter of the insulator 26 so as to form a vacuum tight seal with the insulator. To be explained in more detail, this is important in preventing the loss of vacuum from the interior passage of the tube 14 in a vaccum fixture and for strain relief for the wire. The sleeve has a second larger outer diameter of its internal passage at 32 for surrounding and gripping the combined wire and tube. The diameter of the internal passage of the sleeve at 30, prior to mounting, is slightly smaller than the combined dimension of the tube and wire as seen in FIGS. 3 and 4.

The sleeve is a resilient material preferably made of Delrin (a trademark) made by DuPont and after insertion deforms outward around the wire and tube as seen in FIG. 3 so as to grip and retain the wire and tube together, thereby maintaining the low level resistance electrical contact and the necessary frictional resistance to movement so as to mechanically retain the wire and tube from separation.

The tube 14 has an intermediate larger diameter at 32 and a third even larger diameter at 36. Before mounting onto the tube the diameter of the inner passage in the sleeve at 36 is slightly smaller than the outer diameter of the tube at 36 so that after the sleeve is mounted as seen in FIG. 3 a tight gripping and sealing relationship is established between the sleeve and tube which prevents loss of vacuum from inside of the tube. In this manner, any vacuum applied at the right end of the tube 14 cannot leak because the sleeve forms a closed chamber between the end insulator at 28 and the outer perimeter of the tube at 36.

The intermediate larger diameter of the tube at 32 provides two functions. One is that it helps pilot the inside of the sleeve up onto the third larger diameter of the tube at 36. Another is that it provides a stop for the inward travel of a spring probe 15 as seen in FIGS. 2 and 3.

The retention of the wire onto the tube is enhanced by the edge of the tube in the opening 20. As the wire and tube are pulled apart the wire will engage the semicircular inwardly extending edge 45 of the tube of stop 40 thereby assisting in restraining separation.

Preferably, the outer diameter of the tube is about 0.036 inches (0.914 millimeters) at 36 and about 0.027 inches (0.686 millimeters) at 28. Before mounting on the insulator and tube preferably the outer diameter of the sleeve is approximately 0.046 inches (1.168 millimeters) the inside diameter is about 0.019 inches (0.483 millimeters) at 28, 0.027 inches (0.686 millimeters) at 30 and 0.035 inches (0.889 millimeters) at 36. The length of the sleeve from end to end is about 0.350 inches (8.89 millimeters). The angle "a" of the ramp is approximately 30° relative to the bottom wall of the tube and the ramp extends from substantially the side of the passage opposite from the side opening to the side opening so as to reliably contact the wire during insertion. To provide the required retention the length of the wire and groove external to the side opening is about 0.056 inches (1.422 millimeters). With the aforementioned dimensions the preferred wire size is 30 gauge or about 0.01 inches (0.254 millimeters) in diameter. Preferably, the sleeve 26 has a knurled end 26a which allows the user to properly orient the sleeve so that the larger inner diameter end can be placed facing towards the end of the insulated wire and thereby be properly oriented when slid over the tube. Without this feature one would normally not be able to determine the proper orientation of the sleeve because of its miniature size.

Additionally, when connecting an assembly of the type described at opposite ends of a wire in a machine it is possible to use a color coding on the sleeve which involves the same color sleeve at each end of the wire to allow for easy location of the opposite ends of the same wire during assembly.

Figure 7:
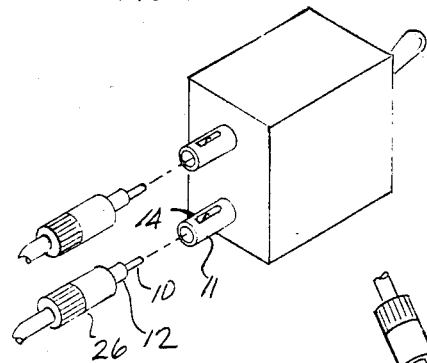
FIG. 7 is a schematic and pictorial view of an alternate embodiment of the invention in which the electrical connector and flexible wire assembly are used for termination of electrical connections to a switch block.
Figure 8:
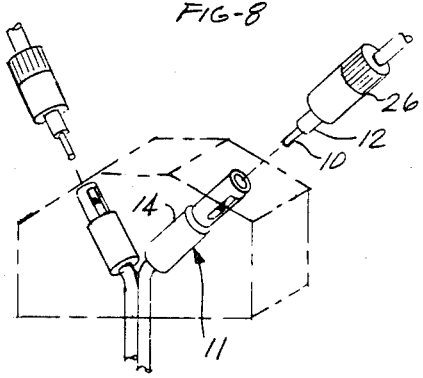
FIG. 8 is a schematic and pictorial view of an alternate embodiment of the invention in which the electrical connector and flexible wire assembly are employed for termination of connections to a connector block.

In a preferred embodiment, the electrical contact and insulated flexible wire assembly form a receptacle and wire assembly for a spring probe substantially as shown in FIG. 6. Alternately, the assembly may be used for quick termination of conductors to a switch assembly, such as that depicted in FIG. 7. Alternately, the assembly may be used for quick termination of insulated conductors to a connector block as depicted in FIG. 8.

Figure 9:
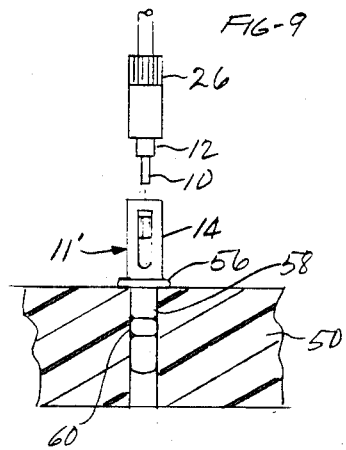
FIG. 9 is a schematic and pictorial view of an alternate embodiment of the present invention in which the electrical connector and flexible wire assembly are used for terminating connections to a circuit board.

A preferred embodiment for the assembly is in a vacuum test fixture (see FIG. 9), having a probe plate 50 and a tube 14. Tube 14 has a stop 56 which engages the top surface of the probe plate. The tube has a smaller diameter portion 58 with a outwardly extending press ring 60 which forms a tight interference fit with the wall of a hole drilled in the probe plate 50.

Figure 10:
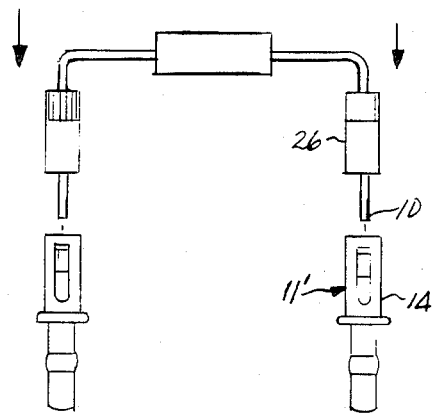
FIG. 10 is a schematic and pictorial view of an alternate embodiment of the invention for connecting uninsulated leads of an electrical component using the electrical connector and flexible wire assembly according to the present invention.

Alternately, the assembly may be used for terminating uninsulated leads on an electrical component, such as a resistor, a capacitor, etc. (FIG. 10).

Accordingly, the foregoing description should not be read as pertaining only to the precise structures and techniques described, but rather should be read consistent with, and as support for, the following claims, which are to have their fullest fair scope.

What is claimed is:

1. Electrical connector and flexible wire assembly with quick termination, the assembly comprising:
   a flexible electrically conductive wire having a bare end;
   an electrical connector comprising an electrically conductive tube, the tube comprising an internal passage, separate axial end opening and transverse side opening to the passage and a ramp extending toward the side opening from in the passage;
   the bare end of the wire extending into the passage through the end opening, along the ramp, out of the side opening and along an external side of the tube; and
   a non-conductive sleeve extending around and gripping the combination of the bare wire and the tube to thereby retain the bare wire and tube in mechanical and electrical contact with each other.

2. The assembly of claim 1 wherein the bare end of the wire is unbonded to the external side of the tube.

3. The assembly of claim 1 wherein the wire is mounted in and the bare end of the wire extends from the end of an insulator.

4. The assembly of claim 1 wherein the tube comprises an edge adjacent the transverse side opening, the edge engaging and assisting in retaining the bare end of the wire mechanically connected to the tube.

5. The assembly of claim 1 wherein the tube comprises a groove on the exterior wall for receipt of the bare end of the wire and maintaining alignment therewith.

6. The assembly of claim 5 wherein the groove comprises opposing sides adjacent the bare end of the wire, the bare end of the wire extending into the groove and engaging the opposing sides of the groove.

7. The assembly of claim 6 wherein the groove comprises a radius of curvature which is smaller than the radius of curvature of the bare end of the wire.

8. The assembly of claim 1 wherein the bare end of the wire is bent into a substantially "S" shape extending along said passage, the ramp and the external side of the tube.

9. The assembly of claim 1 wherein the ramp is at an angle to both the portion of the passage containing the bare end of the wire and the portion of the external side of the tube along which the bare end of the wire extends.

10. The assembly of claim 1 wherein the ramp is at an oblique angle to said portion of the passage containing the bare end of the wire and at an oblique angle to said portion of the external side of the tube along which the bare end of the wire extends.

11. A quick termination assembly for making up an electrical connector to a flexible wire having a bare end, the assembly comprising:
   a connector comprising an electrically conductive tube, the tube comprising an internal passage extending along an axis of the tube, separate end opening and side opening to the passage and a ramp extending towards the side opening from the passage,
   the end opening and passage being adapted to receive upon insertion therein, such a bare end of the wire, the ramp, during such insertion, forcing such bare end of the wire to bend and move along the ramp out of the side opening and extend away from the tube; and
   a non-conductive sleeve extending around the wire, the sleeve as it is forced to slide along the wire and the tube being adapted to engage the bare end of the wire when so extending away from the tube, causing the bare end of the wire to bend against an exterior side of the tube and pass over and encircle the bare end of the wire and the tube thereby gripping and retaining the bare end of the wire and tube in electrical and mechanical contact with each other.

12. The assembly of claim 11 wherein the tube comprises an edge adjacent the side opening, the edge engaging and assisting in retaining the bare end of the wire in mechanical contact with the tube.

13. The assembly of claim 11 wherein the tube comprises a groove on the exterior wall for receipt of the bare end of the wire.

14. The assembly of claim 8 wherein the groove comprises opposing sides for engagement with the bare end of the wire.

15. The assembly of claim 14 wherein the groove comprises a radius of curvature which is smaller than the radius of curvature said bare end of the wire.

16. The assembly of claim 11 wherein the wire has an insulator which extends around the wire and wherein the tube comprises a stop inwardly extending into the passage, between the end opening and the side opening, for engaging and stopping the movement of an end of the insulator and thereby stop the wire during insertion.

17. The assembly of claim 11 comprising a groove in the ramp for guiding the bare end of the wire along the ramp and out of the side opening during such insertion.

18. The assembly of claim 11 wherein the ramp extends from substantially one side of the passage to the other.

19. The assembly of claim 11 wherein the passage has a side opposite from the side opening and the ramp has a substantially 30° angle relative to the side of the passage opposite from the side opening.

20. The assembly of claim 11 wherein the tube has a substantially circular cross-section.

21. The assembly of claim 13 wherein the tube has a first peripheral portion on the opposite side of said groove from the end opening and a second peripheral portion around said groove, the first peripheral portion being larger than the second peripheral portion.

22. The assembly of claim 21 wherein the wire has a non-conductive insulator thereon and wherein the sleeve has an internal passage with a first internal periphery for gripping and sealing around the exterior of such insulator, with a second larger internal periphery for surrounding and gripping the combined wire and tube at the second peripheral portion of the tube and with a third even larger internal periphery for surrounding, gripping and sealing the first peripheral portion of the tube.

23. The assembly of claim 13 wherein the groove and side opening are in alignment substantially with a plane parallel with the axis of the tube.

24. The assembly of claim 13 comprising a groove on the ramp, wherein the groove on the ramp and the groove on the exterior wall extend substantially in alignment with a plane parallel with the axis of the tube.

25. A method for quick termination of an electrical contact comprising an electrically conductive tube having a ramp, the method comprising the steps of:
inserting a bare flexible wire into an end opening to a passage in the tube;
during such insertion, utilizing the ramp to force the bare wire transversely out of the passage through a side opening of the tube to a position extending away from the tube; and
sliding a non-conductive sleeve along the wire over the tube and against the extending wire thereby forcing such wire to bend against an exterior side of the tube until the sleeve passes around and grips and retains both the wire and tube in electrical and mechanical contact with each other.

26. The method of claim 25 wherein an insulator extends around the wire and wherein the step of sliding comprises the step of leaving the sleeve extended around the insulator.

27. The method of claim 26 wherein the step of inserting comprises the step of inserting the wire until the movement of the insulator is arrested by a stop in the passage of the tube.

* * * * *